United States Patent
Day et al.

(10) Patent No.: US 11,042,018 B2
(45) Date of Patent: Jun. 22, 2021

(54) MICROFLUIDICS ANALYSIS SYSTEM

(71) Applicant: THE UNIVERSITY OF BRISTOL, Bristol (GB)

(72) Inventors: John Charles Clifford Day, Bristol (GB); Alastair Poole, Bristol (GB)

(73) Assignee: The University of Bristol

( * ) Notice: Subject to any disclaimer, the term of this patent is extended or adjusted under 35 U.S.C. 154(b) by 0 days.

(21) Appl. No.: 16/632,204

(22) PCT Filed: Jul. 11, 2018

(86) PCT No.: PCT/GB2018/051965
§ 371 (c)(1),
(2) Date: Jan. 17, 2020

(87) PCT Pub. No.: WO2019/016516
PCT Pub. Date: Jan. 24, 2019

(65) Prior Publication Data
US 2020/0233195 A1    Jul. 23, 2020

(30) Foreign Application Priority Data
Jul. 20, 2017    (GB) ..................................... 1711699

(51) Int. Cl.
*G02B 21/02*    (2006.01)
*B01L 3/00*    (2006.01)
(Continued)

(52) U.S. Cl.
CPC ........ *G02B 21/02* (2013.01); *B01L 3/502715* (2013.01); *G02B 21/0048* (2013.01);
(Continued)

(58) Field of Classification Search
CPC ............... G02B 21/00; G02B 21/0032; G02B 21/0048; G02B 21/02; G02B 21/367; A61B 5/026; B01L 3/502715; G01N 1/10
See application file for complete search history.

(56) References Cited

U.S. PATENT DOCUMENTS 5,598,841 A * 2/1997 Taniji ................... A61B 5/0261
600/342
2006/0211071 A1    9/2006 Andre et al.
(Continued)

FOREIGN PATENT DOCUMENTS

JP    2004251630 A    9/2004
WO    2006065739 A3    6/2006
(Continued)

*Primary Examiner* — Thai Q Tran
*Assistant Examiner* — Sunghyoun Park
(74) *Attorney, Agent, or Firm* — Maynard Cooper & Gale, P. C.; Jon E. Holland

(57) ABSTRACT

A microfluidics analysis system with a microfluidics cell and a microscope. The microscope has an objective lens arranged to collect light from a field of view including a portion of the microfluidics cell; a second lens; and an actuator arranged to translate the objective lens relative to the microfluidics cell to change a position of the field of view between multiple positions. The actuator is arranged to translate the objective lens relative to the microfluidics cell without moving the second lens relative to the microfluidics cell. The second lens is arranged to receive the light collected by the objective lens for the multiple positions of the field of view without moving relative to the microfluidics cell.

17 Claims, 9 Drawing Sheets

(51) Int. Cl.
  *G02B 21/00* (2006.01)
  *G02B 21/36* (2006.01)
(52) U.S. Cl.
  CPC .... *G02B 21/367* (2013.01); *B01L 2300/0654* (2013.01); *B01L 2300/0816* (2013.01); *B01L 2300/0877* (2013.01); *B01L 2300/16* (2013.01); *B01L 2400/0487* (2013.01)

(56) References Cited

U.S. PATENT DOCUMENTS

| | | |
|---|---|---|
| 2008/0045848 A1 | 2/2008 | Lacombe et al. |
| 2012/0206727 A1 | 8/2012 | Schulte et al. |
| 2013/0003172 A1* | 1/2013 | Widzgowski ...... G02B 21/0036 359/385 |
| 2014/0357511 A1* | 12/2014 | Handique ............ C12Q 1/6886 506/9 |
| 2015/0112490 A1* | 4/2015 | Calderon .......... B01L 3/502761 700/282 |
| 2016/0081150 A1 | 3/2016 | Lochmann et al. |
| 2016/0258968 A1* | 9/2016 | Jain ..................... B01L 3/50273 |
| 2016/0340631 A1* | 11/2016 | Wang .................. C12N 5/0693 |
| 2016/0377525 A1* | 12/2016 | Foster .................. B07C 5/3425 435/34 |

FOREIGN PATENT DOCUMENTS

| | | |
|---|---|---|
| WO | 2010077784 A1 | 7/2010 |
| WO | 2015102726 A2 | 7/2015 |

* cited by examiner

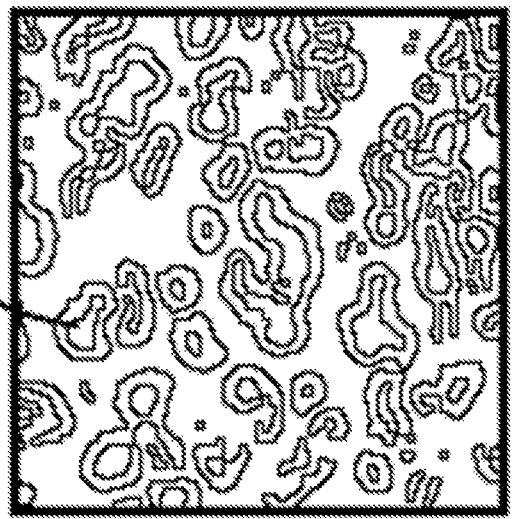

MICROFLUIDICS ANALYSIS SYSTEM

FIELD OF THE INVENTION

The present invention relates to a microfluidics analysis system and associated method, optionally but not exclusively for observing thrombi forming in a flow of blood.

BACKGROUND OF THE INVENTION

The ability of blood to clot is critical for us to stop bleeding. There are however a wide variety of circumstances where the mechanisms underlying clot formation are abnormal or need to be controlled by drugs. People vary from those who bleed too easily through to those at risk of thrombosis, where blood clots too readily, blocking blood vessels and leading to conditions such as deep vein thrombosis or heart attack. Blood platelets are the central cell involved in this process. Although several bedside tests of how well platelets function are currently available for clinical use, none provide estimates accurate enough to predict whether a patient has a tendency to bleed or is at high risk of thrombosis. This is enormously important in a variety of hospital-based situations, including major surgery, patients on antithrombotic therapies and patients undergoing blood transfusions.

Many laboratories perform platelet studies in which blood clotting is induced in a controlled environment and imaged under a confocal or conventional microscope. Typically, blood is passed through a small flow cell coated with collagen or other agonist of interest, at a flow rate calculated to create shear rates comparable with those found within the body. Imaging takes place through an optical window and the size and rate of thrombus formation is determined by analysis of the resultant images. Whole blood is generally used in these systems, usually doped with a fluorescent dye such as DiOC6 which tags blood platelets. Fluorescence imaging then provides enhanced contrast of platelets and the resulting thrombi. This technique has the potential for a far more physiological relevant measurement than that provided by current clinical instruments and may provide several metrics describing different mechanisms of thrombus formation as opposed to a single value which cannot discriminate between differing aspects of platelet function.

SUMMARY OF THE INVENTION

A first aspect of the invention provides a microfluidics analysis system comprising: a microfluidics cell; and a microscope comprising an objective lens arranged to collect light from a field of view including a portion of the microfluidics cell; a second lens; and an actuator arranged to translate the objective lens relative to the microfluidics cell to change a position of the field of view between multiple positions, wherein the actuator is arranged to translate the objective lens relative to the microfluidics cell without moving the second lens relative to the microfluidics cell, and the second lens is arranged to receive the light collected by the objective lens for the multiple positions of the field of view without moving relative to the microfluidics cell.

Preferably the actuator is arranged to translate the objective lens relative to the second lens in a direction which is transverse to an optical axis of the objective lens to change the position of the field of view between the multiple positions.

A second aspect of the invention provides an analysis method comprising: generating a flow of a fluid in a microfluidics cell; and observing the microfluidics cell with a microscope by: collecting light from a field of view of an objective lens, the field of view including a portion of the microfluidics cell; translating the objective lens relative to the microfluidics cell to change a position of the field of view between multiple positions; and receiving the light collected by the objective lens with a second lens for multiple positions of the field of view without moving the second lens relative to the microfluidics cell.

A further aspect of the invention provides a microfluidics analysis system comprising: a microfluidics cell; and a microscope comprising an objective lens arranged to collect light from a field of view including a portion of the microfluidics cell; a second lens arranged to receive the light collected by the objective lens; and an actuator arranged to translate the objective lens relative to the second lens in a direction which is transverse to an optical axis of the objective lens to change a position of the field of view between multiple positions.

The second lens may be an eyepiece lens, and the microscope is used to view the microfluidics cell directly via the eyepiece lens. However more typically the microscope further comprises a light detector, wherein the second lens is arranged to project the light received from the objective lens onto the light detector.

Optionally an image processor, such as a personal computer, is coupled to the light detector, wherein the image processor is arranged to process signals from the light detector to generate one or more images. For example the image processor may be arranged to process signals from the light detector to generate multiple images each associated with a respective one of the multiple fields of view; or to generate a single image as a montage compiled from the multiple fields of view.

Preferably a display is arranged to display the image(s) generated by the image processor.

The light detector may be an array detector with a one-dimensional or two-dimensional array of light detection elements.

Optionally the system further comprises a pump arranged to pump a fluid into the microfluidics cell.

Optionally a surface of the microfluidics cell is coated with a material, such as collagen, which promotes the formation of thrombi by blood platelets.

Optionally the second lens is larger than the objective lens.

Optionally the second lens has a diameter which is larger than a diameter of the objective lens. Typically the diameters of the lenses have a ratio greater than 2:1 or greater than 3:1—in other words the second lens has a diameter which is at least two or three times larger than a diameter of the objective lens.

In one embodiment the objective lens and the second lens are arranged so that as the objective lens translates, the light received by the second lens translates across the second lens.

In another embodiment the microscope further comprises a mirror arranged to receive the light collected by the objective lens and reflect it onto the second lens along an optical path; the actuator is arranged to translate the mirror together with the objective lens; and the actuator is arranged to translate the mirror in line with the optical path, so that as the mirror translates, the light reflected by the mirror onto the second lens does not translate across the second lens.

A focal adjustment actuator may be arranged to move the objective lens in order to focus on the microfluidics cell. The focal adjustment actuator is typically arranged to move the objective lens along an optical axis of the objective lens.

Preferably the microfluidics cell comprises a microfluidics channel, and the actuator is arranged to translate the objective lens along the microfluidics channel to change the position of the field of view. Typically the microfluidics channel has a width less than 1 mm.

The analysis method may comprise making multiple observations of the microfluidics cell via the second lens, each observation being associated with a respective one of the multiple positions of the field of view; and determining a metric based on the multiple observations.

Optionally the fluid is a biological fluid.

Optionally the fluid is blood.

In one embodiment the method comprises making multiple observations of the formation of thrombi in the microfluidics cell, each observation being associated with a respective one of the multiple positions of the field of view; and determining a metric based on the multiple observations. For instance the metric may indicate a number of thrombi.

BRIEF DESCRIPTION OF THE DRAWINGS

Embodiments of the invention will now be described with reference to the accompanying drawings, in which:

FIGS. 11-13 are three images in a time lapse sequence showing the formation and merging of thrombi.

DETAILED DESCRIPTION OF EMBODIMENT(S)

Figure 1:
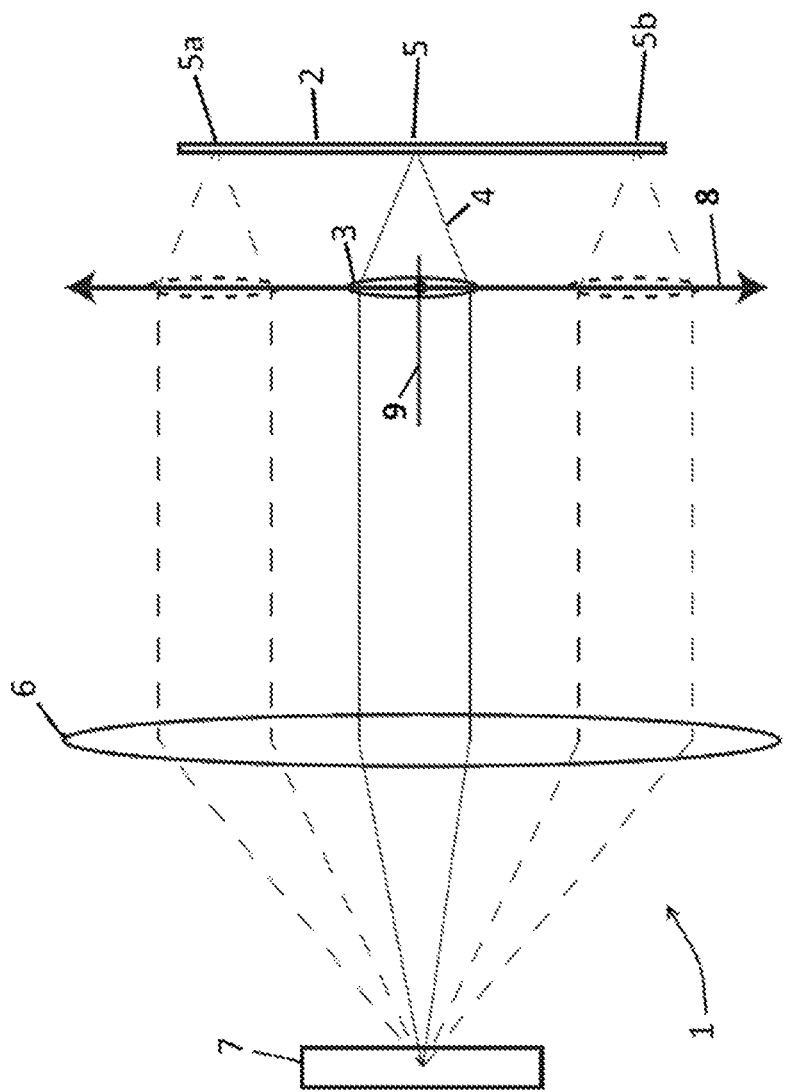
FIG. 1 is a schematic view of a microfluidics analysis system.

FIG. 1 is a schematic view of a microfluidics analysis system. A microscope 1 is used to observe a microfluidics cell 2. The microscope 1 comprises an objective lens 3 arranged to collect light 4 from a field of view including a portion of the microfluidics cell 2. A second lens 6 is arranged to receive the light collected by the objective lens 3 and project it onto a two-dimensional array light detector 7. An actuator (not shown) such as a stepper motor is arranged to translate the objective lens 3 relative to the microfluidics cell 2 to change a position of the field of view between multiple positions, for instance the positions labelled 5, 5a, 5b in FIG. 1.

The actuator is arranged to translate the objective lens 3 relative to the second lens 6 in a direction 8 which is transverse to an optical axis 9 of the objective lens 3 to change the position of the field of view between the multiple positions. In this case the direction of movement 8 of the objective lens 3 is at right angles to the optical axis 9 of the objective lens 3.

The objective lens 3 moves laterally relative to the microfluidics cell 2 while the second lens 6 remains stationary. The second lens 6 is arranged to receive the light collected by the objective lens 3 for the multiple positions 5, 5a, 5b of the field of view without moving.

The optical arrangement is such that as the objective lens 3 translates, the light received by the second lens 6 translates laterally across the second lens 6. For this reason the second lens 6 is much larger than the objective lens 3—in this case the diameters of the lenses have a ratio of about 5:1.

Where the microfluidics cell 2 comprises a microfluidics channel, then the objective lens 3 may only need to be moved in one dimension (X) as shown in FIG. 1 along the length of the channel. Where the cell 2 extends in two orthogonal directions (X,Y) so that the field of view of the objective lens 3 does not cover the entire dimension (Y) perpendicular to the line of travel shown in FIG. 1, then the objective lens 3 may be moved in both directions (X and Y) substantially parallel to the plane of the cell 2.

An additional focussing movement may be applied to the objective lens 3 along the Z-axis parallel to the optical axis 9 of the objective lens 3 and substantially perpendicular to the plane of the cell 2. Optionally this focussing movement is electrically induced by a voice coil surrounding the objective lens 3.

FIGS. 2-10 show a microfluidics analysis system 100 which operates according to the same principles as the system as shown in FIG. 1. The system of FIGS. 2-10 is for analysing the formation of thrombi by blood platelets.

Figure 8:
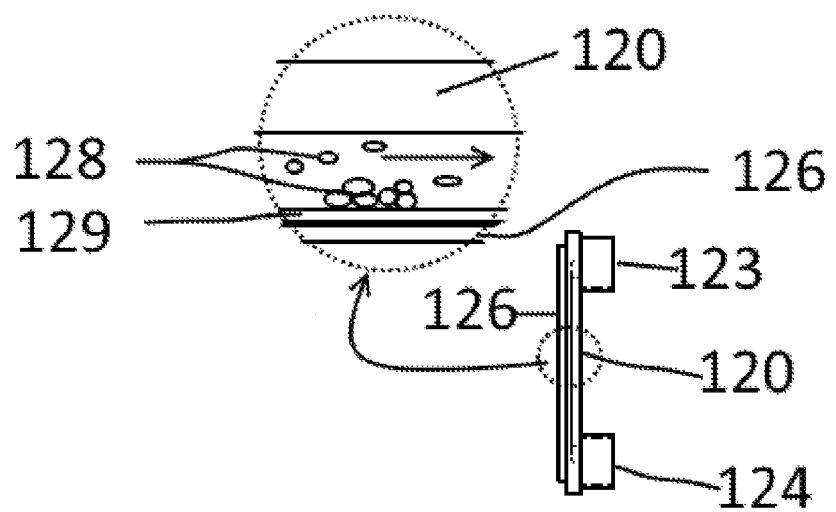
FIG. 8 is a side view of the microfluidics cell, including an enlarged sectional view along a channel showing the collagen layer and blood platelets.

The system 100 uses a Cellix Vena8 microfluidics cell (Cellix ltd Ireland) shown in detail in FIGS. 5-8. The cell comprises a collagen-coated glass coverslip 126 shown in FIG. 8, and a transparent body 120 containing eight flow channels with an approximately square cross-section, between 0.4 mm to 0.8 mm across and 10 mm long. One of the flow channels is labelled 125 in FIGS. 5 and 6. Each channel has a connection port at each end—the connection ports of the channel 125 being labelled 123, 124. FIG. 8 includes a detailed cross-section of the flow channel in which blood flows through the channel as indicated by the arrow. Platelets 128 adhere to the collagen coating 129 and coalesce to form thrombi that are imaged through the coverslip 126. In one configuration the cell body 120 is mounted on a heated plate, not shown, to keep the temperature at the desired level for the experiment, typically in the range 30° C. to 38° C.

Figure 2:
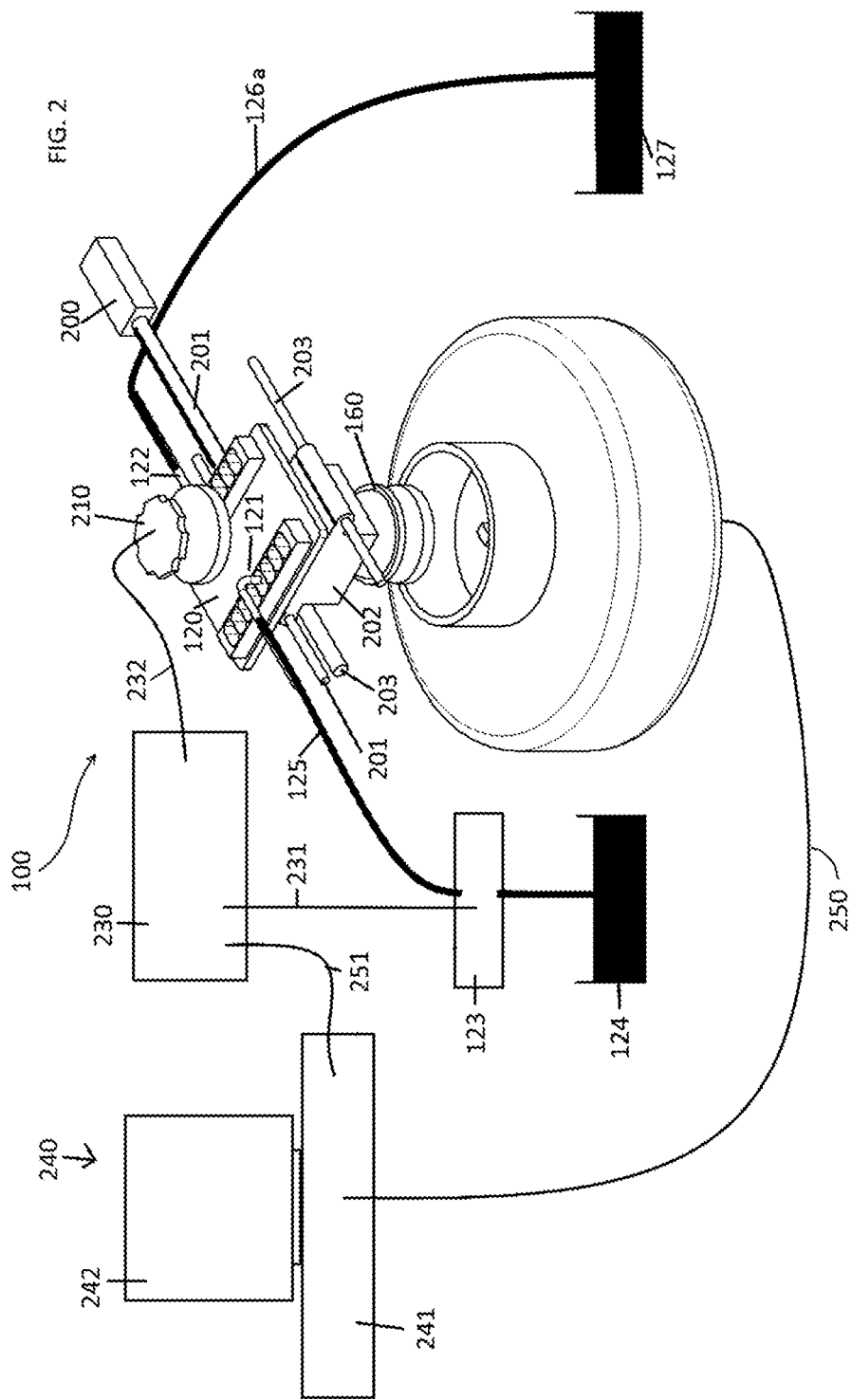
FIG. 2 shows a detailed view of a microfluidics analysis system.
Figure 3:
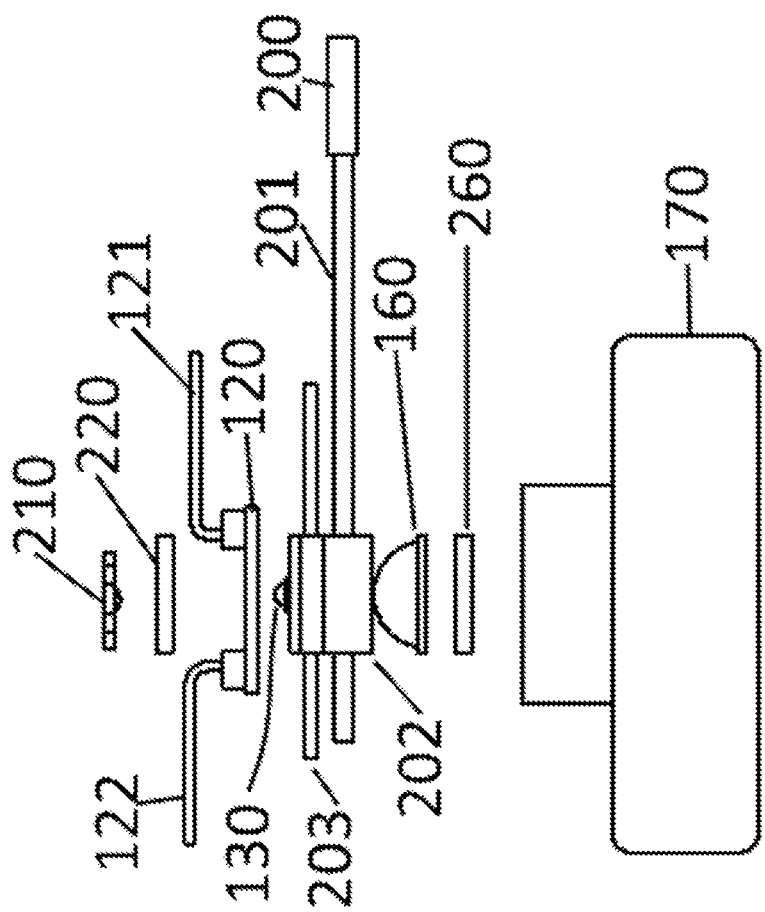
FIG. 3 is an exploded view showing the microfluidics cell and microscope.

In FIG. 2 a fluid reservoir 127 containing blood is shown connected to the port 123 by a line 126a and a connector 122; and a fluid drain 124 containing blood is shown connected to the port 124 by a line 125 and a connector 121. The blood is drawn from the reservoir 127 into the drain 124 via the channel 125 by a syringe pump 123 (Cellix ltd Ireland). The pump 123 is controlled by a microcontroller 230 via a control line 231. The speed of the pump 123 is set such that the flow rate of blood through the channel 125 produces a shear rate within the channel similar to that found in blood vessels within the body.

Figure 10:
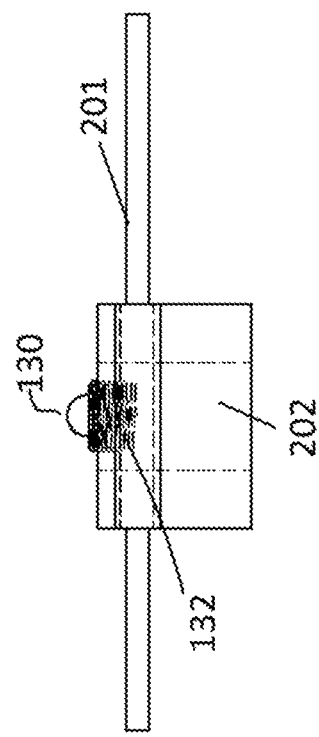
FIGS. 9 and 10 show the sled carrying the voice coil and objective lens.
Figure 9:
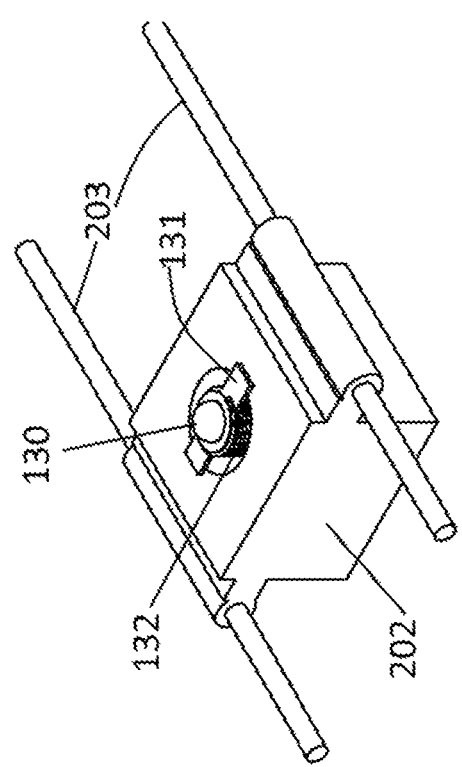

An objective lens 130 is mounted in a voice coil 132 shown in FIGS. 9 and 10 that allows electronic control of the lens's height for focus control. The voice coil 132 is mounted on a sled 202 via flexures 131. The sled 202 incorporates a magnet which generates a field along the optical axis of the objective lens 130 and the voice coil 132. Current in the voice coil 132 causes motion along the optical axis of the objective lens 130. The objective lens 130 has a 2.98 mm focal length, comparable to a conventional 50X microscope objective. The objective lens 130 is arranged to collect light from a field of view including a portion of the channel 125 in its focal plane—three positions of the field of view being labelled 5, 5a, 5b in FIG. 6.

Figure 4:
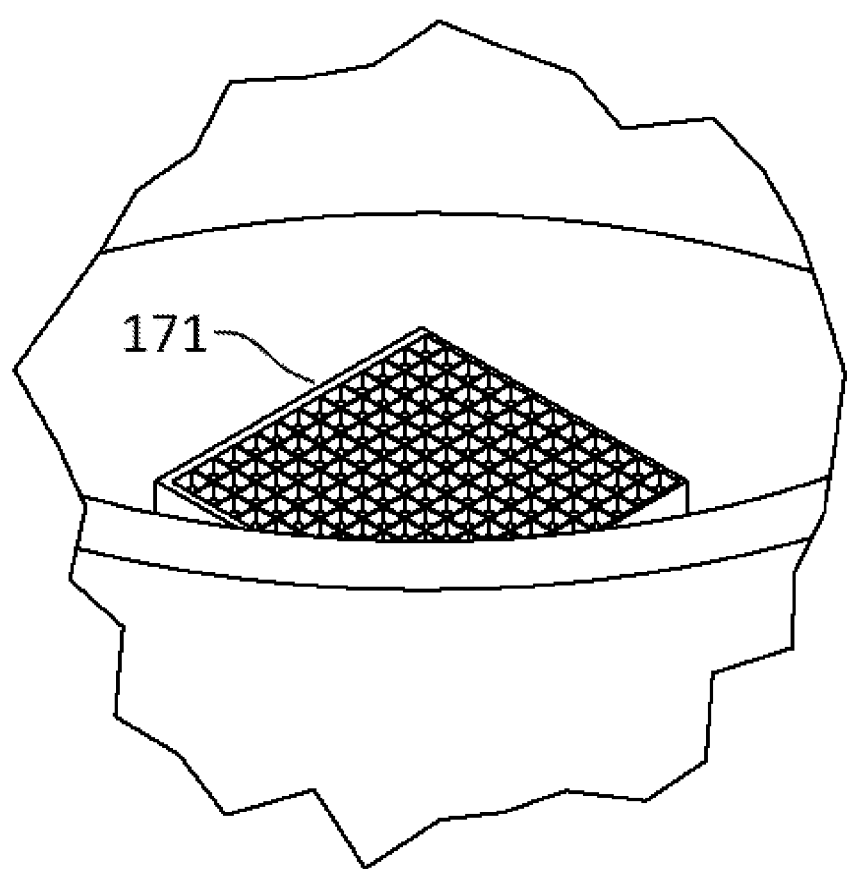
FIG. 4 is an enlarged fragmentary view of the camera, showing the CCD.
Figure 5:
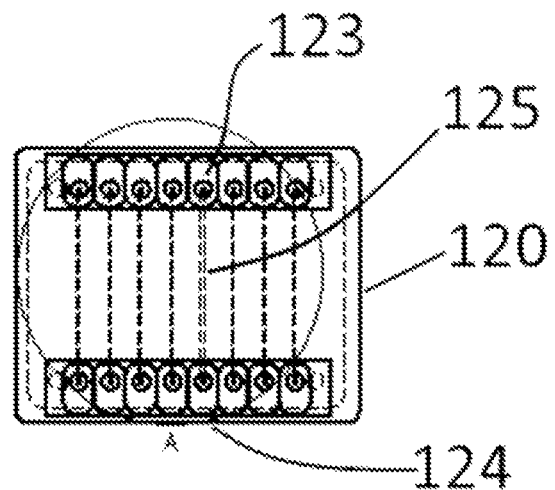
FIG. 5 is a plan view of the microfluidics cell.
Figure 6:
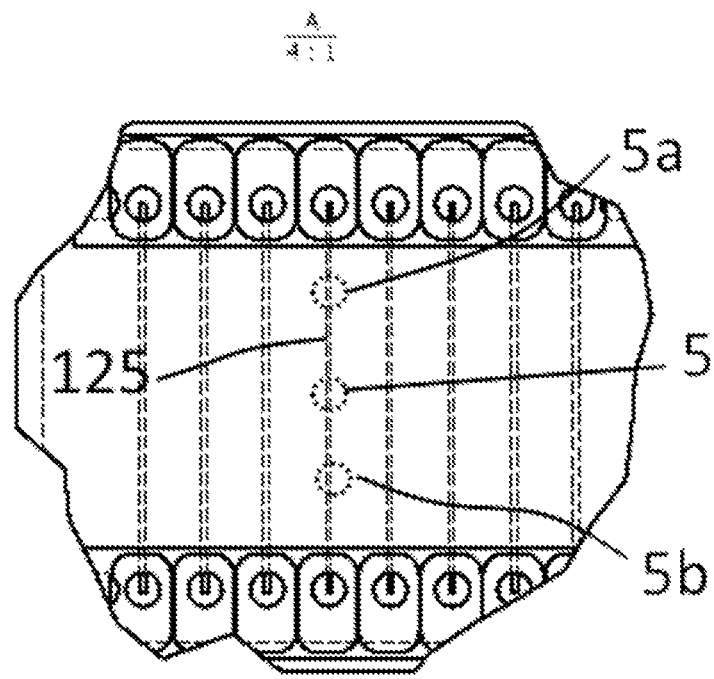
FIG. 6 is an enlarged fragmentary view of the microfluidics cell.
Figure 7:
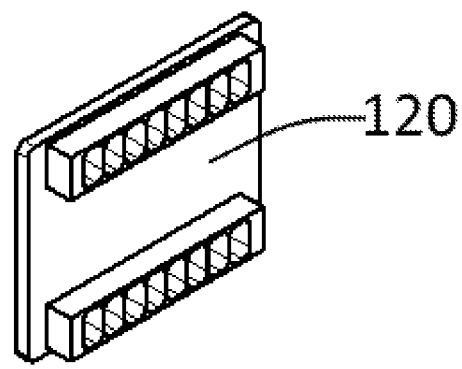
FIG. 7 is an isometric view of the microfluidics cell.

An aspheric second lens 160 (Edmund Optics) is arranged to receive the light collected by the objective lens 130 and project it onto a CCD 171 of a camera 170 as shown in detail in FIG. 4. The second lens 160 has a 25 mm focal length. The camera 170 is an Atik Titan Camera (Artemis CCD UK), and the CCD 171 is a cooled Sony ICX424 CCD having dimensions 5 mm×4 mm with 659×494 pixels each 7.7 µm square. Filling the CCD 171 with the image of a 0.4 mm field of view sets the required magnification to approximately ten, resulting in a theoretical pixel size of 0.8 µm in the object plane.

The objective lens 130 produces an image of the channel 125 some distance behind the objective lens 130 or preferably at infinity. The second lens 160 is of larger diameter and focuses the light from the objective lens 130 to produce an image at the image plane containing the CCD 171.

The sled 202 is mounted on a pair of guide rails 203. A stepper motor 200 is attached to the sled 202 by a drive arm 201. The stepper motor 200 is arranged to translate the sled 202 along the guide rails 203 so that the objective lens 130 moves along the channel 125 transverse to the optical axis of the objective lens 130 to change a position of the field of view between multiple positions, labelled 5, 5a and 5b in FIG. 6. Optionally the moving lens assembly of FIG. 9 is constructed from the optical pickup unit and translation stage of a conventional compact disc or DVD or similar device. A separate stepper motor controller (not shown) is used to control the stepper motor 200.

The second lens 160 is not attached to the sled 202 or the drive arm 201, so that the stepper motor 200 can move the objective lens 130 relative to the microfluidics cell without moving the second lens 160 relative to the microfluidics cell. The large size of the second lens 160 means that it can receive the light collected by the objective lens 130 for the multiple positions 5, 5a, 5b of the field of view without moving relative to the microfluidics cell.

A personal computer (PC) 240 is used to control the microscope 100. The PC comprises a control and processing unit 241, coupled to the camera 171 by a control line 250 and to the microcontroller 230 by a control line 251. The control and processing unit 241 is programmed to process signals from the camera 171 to generate one or more images as described in further detail below. A display screen 242 is arranged to display the image(s) generated by the control and processing unit 241. The control and processing unit 241 is also arranged to analyse the images to generate and store blood analysis metrics as described in further detail below.

The blood sample in the reservoir 127 is doped with the fluorescent tag DiOC6, which has peak excitation wavelength at 482 nm and emission wavelength at 504 nm. A single 5W blue LED 210 (LedEngin LZ1-10B200) for excitation is positioned below the microfluidics cell with a 445 nm bandpass excitation filter 220 with 45 nm bandwidth (Thor Labs W445-45) to remove residual illumination in the excitation band. The LED 210 is controlled by the microcontroller 230 via a control line 232. Additional low power green LEDs (not shown) may also be included below the microfluidics cell for direct, bright field imaging. A 510 nm bandpass collection light filter 260 of 42 nm bandpass is positioned in the imaging path in front of the CCD 171. The microscope only images at the fluorescent wavelength of the tag so chromatic aberration is not a consideration.

Referring to FIGS. 2, 9, 11, 12 and 13: when used to make measurements of blood platelet function, a blood sample of typically 1 ml is acquired by conventional means and a small quantity of the fluorescent tag DiOC6 is mixed. The sample is inserted into the reservoir 127. A fresh channel (for example channel 125) is selected and coated in collagen by filling with a collagen solution and then flushing through with water. The reservoir 127 is connected to the selected channel 125 in the flow cell 120 via pipe 126a. The drain end of the flow cell channel is connected by pipe 125 to the pump 123 which drains into the receiving reservoir 124. The objective lens 130 is translated to move its field of view to a position towards one end of the channel, such as position 5a, and the image is focussed by applying current to the voice coils 132. The objective lens 130 is then moved to other desired points along the channel length, for instance to move the field of view to positions 5 and 5b, and focussed in a similar manner. The control and processing unit 241 stores the values of current required to focus at each point and then interpolates the current needed for any arbitrary point along the flow cell. This value is used to keep the collagen surface 129 of the cell in approximate focus at all positions along the travel. Additionally the control and processing unit 241 may be programmed to adjust focus based on the sharpness of the image obtained. The pump 123 causes blood to enter the flow cell, and the control and processing unit 241 and microcontroller 230 cause the objective 130 to traverse the cell, acquiring images at multiple points along the cell. At the end of each traverse, the objective lens 130 returns to the start position and repeats the process to create a time lapse sequence at each position. FIGS. 11-13 shows three images presented on the display 242, each image being a different image in the time lapse sequence for a single position of the field of view. Platelets start to adhere to the collagen creating small thrombi, such as 250, 251, as shown in FIG. 11. As time elapses the thrombi grow larger and more numerous as shown in FIG. 12. Thrombi may subsequently merge together forming larger thrombi. So for example FIG. 13 shows a thrombus 252 formed from two merged thrombi 250, 251. The size and number of thrombi as a function of time is used by the control and processing unit 241 to deduce metrics relating to platelet function.

An advantage of acquiring multiple time lapse sequences, each sequence associated with a different position 5, 5a, 5b of the field of view, is that the metrics are less sensitive to systematic errors caused by, for instance, variation in the thickness of the collagen layer along the length of the channel. Additionally, obtaining data from multiple points along the flow cell makes the metrics less sensitive to random errors by providing a larger data set from a larger total area.

Figure 14:
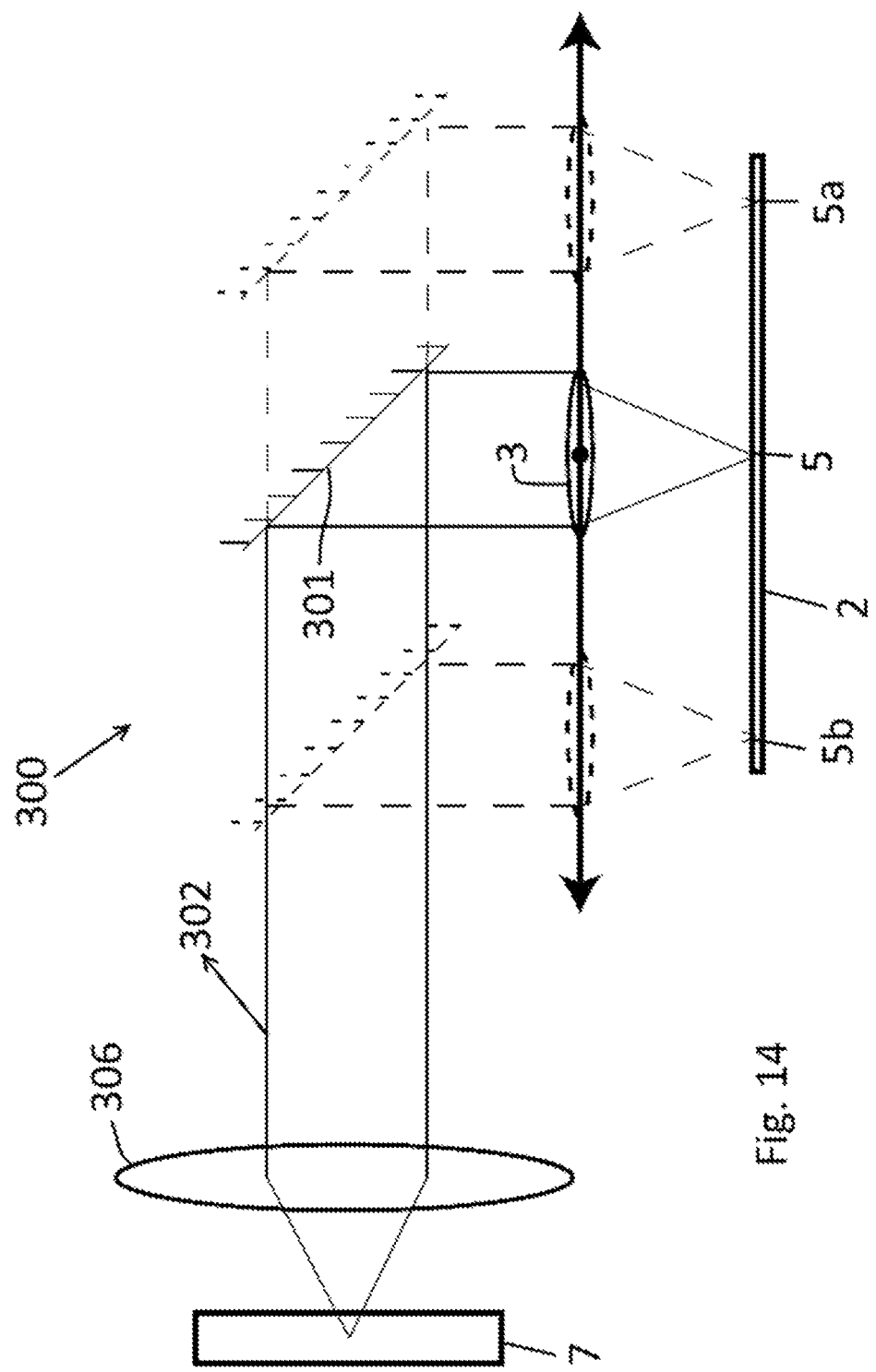
FIG. 14 is a schematic view of a microfluidics analysis system with an alternative optical arrangement.

A microscope 300 with an alternative optical arrangement is shown in FIG. 14. The microscope 300 further comprises a mirror 301 arranged to receive the light collected by the objective lens 3 and reflect it onto a second lens 306 along an optical path 302. The actuator is arranged to translate the mirror 301 together with the objective lens 3 in line with the optical path 302 and transverse to the optical axis of the objective lens 3, so that as the mirror 301 translates, the light reflected by the mirror 301 onto the second lens 306 does not translate laterally across the second lens 306. As a result the second lens 306 can be relatively small compared with the second lens 6 in FIG. 1. The embodiment of FIG. 14 also suffers less optical aberration than the embodiment of FIG.

1, since the light remains incident on the centre of the second lens 306. However a problem with the embodiment of FIG. 14 is that, unlike the embodiment of FIG. 1, it cannot accommodate motion of the objective lens 3 in the Y direction (in and out of the plane of FIG. 14).

Although the invention has been described above with reference to one or more preferred embodiments, it will be appreciated that various changes or modifications may be made without departing from the scope of the invention as defined in the appended claims.

The invention claimed is:

1. A microfluidics analysis system comprising:
a microfluidics cell; and
a microscope comprising an objective lens arranged to collect light from a field of view including a portion of the microfluidics cell; a second lens; and an actuator arranged to translate the objective lens relative to the microfluidics cell to change a position of the field of view between multiple positions,
wherein the actuator is arranged to translate the objective lens relative to the microfluidics cell without moving the second lens relative to the microfluidics cell, and the second lens is arranged to receive the light collected by the objective lens for the multiple positions of the field of view without moving relative to the microfluidics cell,
further comprising:
a light detector, wherein the second lens is arranged to project the light received from the objective lens onto the light detector, and wherein the light detector is an array detector with a two-dimensional array of light detection elements,
an image processor coupled to the light detector, wherein the image processor is arranged to process signals from the light detector to generate multiple images each associated with a respective one of the multiple fields of view, and
a control and processing unit arranged to determine a metric based on the multiple images.

2. The system of claim 1, further comprising a display arranged to display the image(s) generated by the image processor.

3. The system of claim 1, wherein the second lens has a diameter which is larger than a diameter of the objective lens.

4. The system of claim 1, wherein a surface of the microfluidics cell is coated with a material which promotes the formation of thrombi by blood platelets.

5. The system of claim 1, wherein the objective lens and the second lens are arranged so that as the objective lens translates, the light received by the second lens translates across the second lens.

6. The system of claim 1, wherein the microscope further comprises a mirror arranged to receive the light collected by the objective lens and reflect it onto the second lens along an optical path; the actuator is arranged to translate the mirror together with the objective lens; and the actuator is arranged to translate the mirror in line with the optical path, so that as the mirror translates, the light reflected by the mirror onto the second lens does not translate across the second lens.

7. The system of claim 1, further comprising a focal adjustment actuator arranged to move the objective lens in order to focus on the microfluidics cell.

8. The system of claim 1, wherein the microfluidics cell comprises a microfluidics channel, and the actuator is arranged to translate the objective lens along the microfluidics channel to change the position of the field of view.

9. The system of claim 8, wherein the microfluidics channel has a width less than 1 mm.

10. The system of claim 1, wherein the actuator is arranged to translate the objective lens relative to the second lens in a direction which is transverse to an optical axis of the objective lens to change the position of the field of view between multiple positions.

11. An analysis method comprising: generating a flow of a fluid in a microfluidics cell; and observing the microfluidics cell with a microscope by: collecting light from a field of view of an objective lens, the field of view including a portion of the microfluidics cell; translating the objective lens relative to the microfluidics cell to change a position of the field of view between multiple positions; and receiving the light collected by the objective lens with a second lens for multiple positions of the field of view without moving the second lens relative to the microfluidics cell; projecting the light received by the second lens from the objective lens onto a light detector, wherein the light detector is an array detector with a two-dimensional array of light detection elements; processing signals from the light detector to generate multiple images each associated with a respective one of the multiple fields of view; and determining a metric based on the multiple images.

12. The method of claim 11, wherein the method comprises making multiple observations of the microfluidics cell, each observation being associated with a respective one of the multiple positions of the field of view; and determining the metric based on the multiple observations.

13. The method of claim 11, wherein the fluid is a biological fluid.

14. The method of claim 11, wherein the fluid is blood.

15. The method of claim 14, wherein the method comprises making multiple observations of the formation of thrombi in the microfluidics cell, each observation being associated with a respective one of the multiple positions of the field of view; and determining the metric based on the multiple observations.

16. The method of claim 11, wherein the objective lens is translated relative to the second lens in a direction which is transverse to an optical axis of the objective lens to change the position of the field of view between multiple positions.

17. A microfluidics analysis system comprising: a microfluidics cell; and a microscope comprising an objective lens arranged to collect light from a field of view including a portion of the microfluidics cell; a second lens arranged to receive the light collected by the objective lens; and an actuator arranged to translate the objective lens relative to the second lens in a direction which is transverse to an optical axis of the objective lens to change a position of the field of view between multiple positions,
further comprising:
a light detector, wherein the second lens is arranged to project the light received from the objective lens onto the light detector, and wherein the light detector is an array detector with a two-dimensional array of light detection elements,
an image processor coupled to the light detector, wherein the image processor is arranged to process signals from the light detector to generate multiple images each associated with a respective one of the multiple fields of view, and
a control and processing unit arranged to determine a metric based on the multiple images.

* * * * *